(12) United States Patent
Engel

(10) Patent No.: US 9,453,415 B2
(45) Date of Patent: Sep. 27, 2016

(54) BLADE CASCADE WITH SIDE WALL CONTOURS AND CONTINUOUS-FLOW MACHINE

(71) Applicant: MTU Aero Engines AG, Munich (DE)

(72) Inventor: Karl Engel, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 521 days.

(21) Appl. No.: 13/955,192

(22) Filed: Jul. 31, 2013

(65) Prior Publication Data

US 2014/0037453 A1 Feb. 6, 2014

(30) Foreign Application Priority Data

Aug. 2, 2012 (EP) ...................................... 12179045

(51) Int. Cl.
*F01D 5/12* (2006.01)
*F01D 5/14* (2006.01)

(52) U.S. Cl.
CPC ................. *F01D 5/12* (2013.01); *F01D 5/143* (2013.01); *F01D 5/145* (2013.01); *Y02T 50/673* (2013.01)

(58) Field of Classification Search
CPC .......... F01D 5/12; F01D 5/143; F01D 5/145; F01D 2250/73; F01D 2250/711; F01D 2250/712; F01D 2270/17
USPC .......... 416/189, 191, 193 A, 193 R, 228, 235
See application file for complete search history.

(56) References Cited

U.S. PATENT DOCUMENTS

| 7,690,890 | B2 * | 4/2010 | Aotsuka | F01D 5/143 |
| | | | | 415/191 |
| 8,647,066 | B2 | 2/2014 | Guimbard et al. | |
| 2007/0258818 | A1 | 11/2007 | Allen-Bradley et al. | |
| 2011/0044818 | A1 | 2/2011 | Kuhne et al. | |
| 2011/0064580 | A1 | 3/2011 | Barnes et al. | |
| 2011/0189023 | A1 * | 8/2011 | Guimbard | F01D 5/143 |
| | | | | 416/223 R |
| 2012/0201688 | A1 * | 8/2012 | Mahle | F01D 5/143 |
| | | | | 416/235 |
| 2013/0017095 | A1 * | 1/2013 | Lee | F01D 5/081 |
| | | | | 416/239 |

FOREIGN PATENT DOCUMENTS

| DE | 102008021053 | 10/2009 |
| EP | 2136033 | 12/2009 |
| EP | 2187000 | 5/2010 |
| FR | 2928174 | 9/2009 |
| WO | WO 2010/068391 | 6/2010 |

* cited by examiner

*Primary Examiner* — Christopher Verdier
*Assistant Examiner* — Brian P Wolcott
(74) *Attorney, Agent, or Firm* — Davidson, Davidson & Kappel, LLC

(57) ABSTRACT

A blade cascade for a continuous-flow machine having a non-axisymmetrical side wall contour, whereby the side wall contour has at least one suction-side depression that, in the circumferential direction, is at a distance from a suction-side wall, and having a section located upstream from the leading edges and a section located downstream from the leading edges, it has a pressure-side elevation that makes a transition to a pressure-side wall and that is located in a front blade area, and it has a pressure-side depression that is located upstream from the pressure-side elevation, and also discloses a continuous-flow machine having such a blade cascade.

16 Claims, 1 Drawing Sheet

BLADE CASCADE WITH SIDE WALL CONTOURS AND CONTINUOUS-FLOW MACHINE

This claims the benefit of European Patent Application EP 12179045.5-1267, filed Aug. 2, 2012 and hereby incorporated by reference herein.

The invention relates to a blade cascade for a continuous-flow machine, and it also relates to a continuous-flow machine.

A fluid flow conveyed through a flow channel is deflected parallel to the side wall by means of a lateral pressure gradient. Since flow layers that are close to the wall—owing to their lower velocity—are deflected more markedly than flow layers that are far away from the wall, a secondary flow is formed that is superimposed over a main flow. Among other things, this leads to pressure losses. The secondary flows occur regularly in blade cascades of continuous-flow machines such as gas and steam turbines. The blade cascades consist of a plurality of vanes or blades which are arranged next to each other in the circumferential direction in a rotation-symmetrical flow channel and between each of which a blade channel is formed in which the secondary flows arise. The blade channels are each delimited in the radial direction by a radially outer side wall on the housing side or by an outer delimiting wall as well as by a radially inner side wall on the hub side or by an inner delimiting wall. The delimiting walls are formed by a stationary housing section, by a rotor section, by radially inner blade cover plates and/or by radially outer blade cover plates. In the circumferential direction, the blade channels are each delimited by a pressure-side wall and by a suction-side wall of the adjacent blades. In order to reduce the secondary flows or channel vortexes, non-axisymmetrical contours in the form of elevations and/or depressions are often created in the side walls.

Numerous non-axisymmetrical side wall contours are known from the state of the art. Thus, for example, international patent application WO 2010/068391 proposes providing a suction-side depression in the area of a suction-side wall that extends upstream from a blade leading edge. Moreover, this side wall contour has a front pressure-side elevation that extends along the pressure-side wall. This prior-art side wall contour leads to a reduction of the secondary flows, but this still leaves quite a bit of room for improvement.

SUMMARY OF THE INVENTION

It is an object of the present invention to provide a blade cascade for a continuous-flow machine with a reduced secondary flow. Moreover, it is an objective of the invention to create a continuous-flow machine that displays improved efficiency.

A blade cascade according to the invention for a continuous-flow machine has at least one blade channel that is delimited in the circumferential direction by a pressure-side wall of a first blade and by an opposite suction-side wall of an adjacent blade. In the radial direction, the blade channel is delimited by two opposite delimiting walls. In the direction of the main flow, the blade channel is delimited by leading edges and by trailing edges of the blades. At least one suction-side depression and at least one pressure-side elevation are arranged on at least one of the delimiting walls. According to the invention, the suction-side depression is at a distance from the suction-side wall in the circumferential direction, and one of its sections is arranged upstream from the leading edges and its other section is arranged downstream from the leading edges. Moreover, according to the invention, the pressure-side elevation makes a transition into the pressure-side wall and it is located in a front blade area. Moreover, according to the invention, a pressure-side depression is provided that is located upstream from the pressure-side elevation.

The blade cascade according to the invention has a non-axisymmetrical side wall contour. The side wall contour influences a static pressure field on the at least one delimiting wall and on the opposite blade walls in the edge area in such a way that a secondary flow is reduced. In this manner, flow losses are reduced and the leading flow onto a subsequent blade cascade is improved.

Preferably, the at least one suction-side depression, the at least one pressure-side elevation and the at least one pressure-side depression are at a distance from each other, separated by non-contoured delimiting wall sections. As a result, the depressions and the elevation are configured locally and do not make a transition into each other.

Preferably, the at least one suction-side depression extends all the way to the largest curvature of the suction-side wall.

The at least one suction-side depression has a lowest section that preferably extends upstream and downstream from the leading edges.

The at least one pressure-side elevation can run downstream along the pressure-side wall beyond the suction-side depression, whereby its highest section preferably runs upstream all the way to the leading edge.

The at least one pressure-side elevation has a highest section and the at least one suction-side depression has a lowest section which can be configured as a plateau, whereby preferably the highest section has a larger plateau surface than the lowest section.

Here, it is preferable for the lowest section and the highest section to each be located at a radial position whose values are the same.

The at least one suction-side depression and the at least one pressure-side depression can start at approximately the same axial position in the flow direction.

The at least one pressure-side depression is preferably approximately funnel-shaped and it has a lowest section that is located radially outwards with respect to the lowest section of the suction-side depression.

Preferably, at least one suction-side elevation is provided on the suction-side wall downstream from the at least one suction-side depression.

As seen in the circumferential direction, the at least one pressure-side elevation and the at least one suction-side elevation can make a transition into each other and end downstream at approximately the same axial positions.

Preferably, the highest section of the at least one pressure-side elevation is located radially outwards with respect to the highest section of the at least one suction-side elevation, and it has a larger surface area than the highest section of the at least one suction-side elevation.

Preferably, at least the inner delimiting wall is configured to be non-contoured upstream from the depressions and downstream from the trailing edges.

A preferred continuous-flow machine has at least one blade cascade according to the invention. Due to the reduced secondary flows or channel vortexes, such a continuous-flow machine has an improved efficiency in comparison to a continuous-flow machine with a conventional blade cascade.

Other advantageous embodiments of the invention are the subject matter of additional subordinate claims.

DETAILED DESCRIPTION

Figures 1, 2:
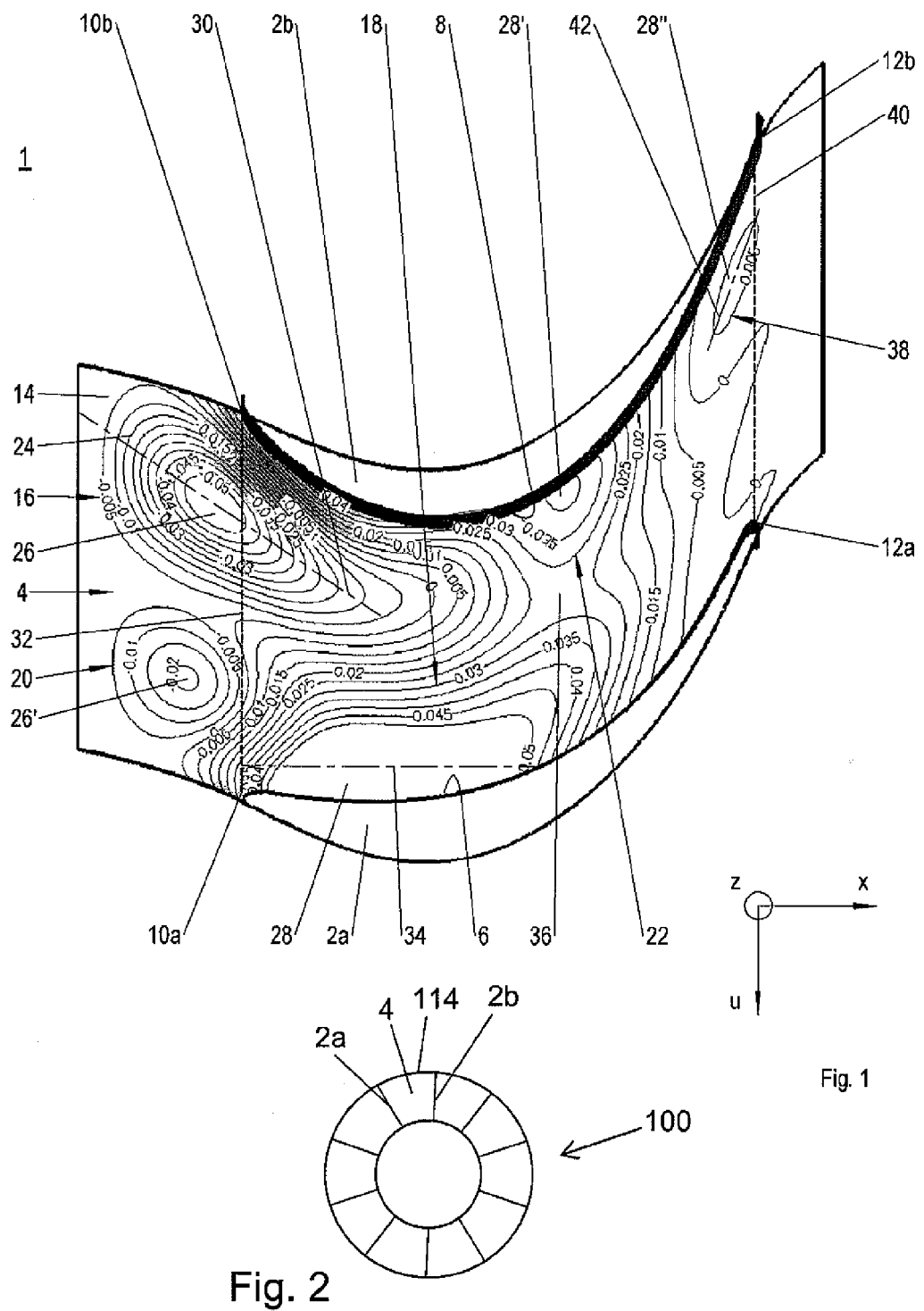
FIG. 1 shows a top view of a developed blade cascade in the area of a blade channel.
FIG. 2 shows schematically a continuous flow machine according to the present invention.

Below, a preferred embodiment of the invention will be explained in greater detail with reference to a schematic depiction. The single FIG. 1 shows a top view of a developed blade cascade according to the invention in the area of a blade channel.

As shown in the single FIG. 1, a blade cascade 1 according to the invention shown by way of an example has a plurality of blades 2a, 2b, which are arranged next to each other in the circumferential direction u and which each delimit a blade channel 4. The blade cascade 1 is preferably a blade cascade of an axial continuous-flow machine such as an aircraft engine or a stationary gas turbine. For example, the blade cascade is arranged in the low-pressure turbine of the continuous-flow machine 100, shown schematically for example in FIG. 2. However, the invention is also used in blade cascades for compressors having an axial design or for compressors as well as turbines having a radial and diagonal design.

A main flow flows through the blade cascade 1 from left to right in the axial direction x, whereby the main flow is appropriately deflected in the blade channels 4 in the circumferential direction u. For the sake of simplicity, below, the axial direction x will be considered to be the flow direction.

As seen in the circumferential direction u, each blade channel 4 is formed by a pressure-side wall 6 of the first blade 2a and by an opposite suction-side wall 8 of the second blade 2b, each blade channel 4 extending between a leading edge 10a, 10b and a trailing edge 12a, 12b of the blades 2a, 2b. In the axial direction x and thus in the flow direction, each blade channel 4 is delimited by the leading edges 10a, 10b and the trailing edges 12a, 12b. In the radial direction z, each blade channel 4 is delimited by a side wall on the hub side or by an inner delimiting wall 14. Moreover, each blade channel 4 is delimited in the radial direction z by a side wall on the housing side, or by an outer delimiting wall (not shown in FIG. 1 because of the sectional view, but shown schematically as 114 in FIG. 2). The inner delimiting wall 14 is formed, for example, by a rotor section or by a platform on the blade root side or by an inner shroud band. The outer delimiting wall is formed, for example, by a housing section or by an outer shroud band on the blade tip side, and can be configured like the inner delimiting wall 14.

At least the inner delimiting wall 14 is provided with a non-axisymmetrical side wall contour in the form of a suction-side depression 16 as well as a pressure-side elevation 18. Moreover, the side wall contour comprises a pressure-side depression 20 and a suction-side elevation 22. The depressions 16, 20 and the elevations 18, 22 are shown in the drawing by a plurality of isohypses and isobaths 24, with a minus sign as the lowest section 26, 26' or with a plus sign as the highest section 28, 28'. The inner delimiting wall 14 is not configured to be contoured upstream from the depressions 16, 20 and downstream from the trailing edges 12a, 12b, but rather, it follows its original course.

The suction-side depression 16 is a section of the inner delimiting wall 14 that extends radially inwards. The suction-side depression 18 is located in the front area of the blade 2b and at a distance from the suction-side wall 6 of the blade 2a, separated by a narrow non-contoured surface section of the inner delimiting wall 14. The depression 18 has an elongated extension and is oriented relative to the suction-side wall 8 in such a way that its longitudinal axis 30 runs approximately tangential to the adjacent suction-side wall section, whereby it is offset with respect to this suction-side wall section so as to extend into the blade channel 4. The suction-side depression 16 extends in the flow direction or in the axial direction x from an area in front of the leading edges 10a, 10b approximately into a channel area having the largest curvature of the suction-side wall. Thus, the suction-side depression 16 is arranged with one section upstream from the leading edges 10a, 10b and with one section downstream from the leading edges 10a, 10b. Its lowest section 26 is on an imaginary circumferential line 32 that connects the leading edges 10a, 10b to each other, said suction-side depression 16 consequently extending upstream and downstream from the leading edges 10a, 10b. Preferably, a wall of the suction-side depression 16 runs more steeply upstream from the lowest section 26 than downstream from the lowest section 26. Starting from the non-contoured surface section of the inner delimiting wall 14, its lowest section 26 is at a radially inner position of approximately −0.05 mm.

The pressure-side elevation 18 is a section of the inner delimiting wall 14 that extends radially outwards. The pressure-side elevation 18 extends essentially from the leading edge 10b of the blade 2a along the pressure-side wall 6. It is at a distance from the suction-side depression 18, separated by a non-contoured surface section of the inner delimiting wall 14. The pressure-side elevation 18 has an elongated extension and is oriented in such a way that its longitudinal axis 34 runs approximately parallel to the axial direction x. Its highest section 28 extends approximately from the leading edge 101) to the axial middle of the blade. Starting from the non-contoured surface section of the inner delimiting wall 14, the highest section 28 is at a radially outer position of approximately +0.05 mm. Thus, the values of the radial positions of the lowest section 26 of the suction-side depression 18 and of the radial position of the highest section 28 are the same. Preferably, the highest section 28 has a surface area extension that is approximately 4 to 6 times larger than the surface area extension of the lowest section 26.

The pressure-side depression 20 is a section of the inner delimiting wall 14 that extends radially inwards. In the circumferential direction u, the pressure-side depression 20 is located next to the suction-side depression 15 and in the axial direction x, it is upstream from the pressure-side elevation 18. It is at a distance from these individual contours 16, 18, separated by a non-contoured surface section. In particular, as seen in the flow direction, the pressure-side depression 20 begins at approximately the same axial position as the suction-side depression 16. Starting from the inner delimiting wall 14, the pressure-side depression 20 tapers approximately like a funnel in the direction of its lowest section 26', whereby its funnel-shaped wall runs more steeply downstream from the lowest section 26' than upstream from the lowest section 26'. Starting from the non-contoured surface section of the inner delimiting wall 14, its lowest section 26' is at a radially inner position of approximately −0.02 mm. Thus, the lowest section 26' of the pressure-side depression 20 is located radially outwards with respect to the lowest section 26 of the suction-side depression 16.

The suction-side elevation 22 is a section of the inner delimiting wall 14 that extends radially outwards and that tapers approximately conically in the direction of its highest section 28'. It is located downstream from a maximum pressure-side curvature of the blade 2a and thus downstream from the suction-side depression 16, directly on the suction-side wall 8. Preferably, it is arranged in the area of a constriction between the blades 2a, 2b. The highest section 28' makes a direct transition into the suction-side wall 8 and, starting from a non-contoured surface section of the inner delimiting wall 14, is at a radially outer position of approximately +0.04 mm. Thus, the highest section 28' of the suction-side elevation 18 is located radially inwards with respect to the highest section 28 of the pressure-side elevation 18. Moreover, the highest section 28' of the suction-side elevation 22 has a smaller surface area than the highest section 28 of the pressure-side elevation 18. In the circumferential direction u, the suction-side elevation 22 makes a transition via a connecting section 36 into the suction-side elevation 18 and ends downstream at approximately the same axial position as the pressure-side elevation 18. The connecting section 36 is elevated relative to a non-contoured surface section of the inner delimiting wall 14, but it is configured as a valley relative to the highest sections 28, 28' of the elevations 18, 22. Starting from a non-contoured surface section of the inner delimiting wall 14, the connecting area 38 is located at a radial position of approximately +0.03 mm.

Moreover, the side wall contour comprises a second suction-side elevation 38 that is located between the first suction-side elevation 22 and the trailing edges 12a, 12b or it comprises an imaginary circumferential line 40 between the trailing edges 12a, 12b. The second or rear suction-side elevation 38 is surrounded by a non-contoured surface section of the delimiting wall 14 and thus at a distance from the suction-side wall 8. It is a section of the inner delimiting wall 14 that extends radially outwards and it has an elongated extension. Preferably, its longitudinal axis 42 is oriented approximately tangentially to the adjacent side wall section, whereby it is offset with respect to this wall section so as to extend into the blade channel 4. Starting from the non-contoured surface section of the inner delimiting wall 14, its highest section 28" is at a radially outer position of approximately +0.005 mm. Thus, the highest section 28" of the rear suction-side elevation 38 is located radially inwards with respect to the highest sections 28, 28', 28" of the pressure-side elevation 18 and of the front suction-side elevation 22.

It should be pointed out that the radial positions or values indicated such as −0.05 mm and +0.05 mm are merely examples of positions and values. The radial individual contours 16, 18, 20, 22, 38 can, of course, have other radial positive or negative extensions without falling outside of the scope of protection of the invention.

The invention discloses a blade cascade for a continuous-flow machine having a non-axisymmetrical side wall contour, whereby the side wall contour has at least one suction-side depression that, in the circumferential direction, is at a distance from a suction-side wall, and having a section located upstream from the leading edges and a section located downstream from the leading edges, it has a pressure-side elevation that makes a transition to a pressure-side wall and that is located in a front blade area, and it has a pressure-side depression that is located upstream from the pressure-side elevation, and the invention also discloses a continuous-flow machine having such a blade cascade.

LIST OF REFERENCE NUMERALS 1 blade cascade
2a, b blade
4 blade channel
6 pressure-side wall
8 suction-side wall
10a, b leading edge
12a, b trailing edge
14 inner delimiting wall
16 suction-side depression
18 pressure-side elevation
20 pressure-side depression
22 (front) suction-side elevation
24 isohypses/isobaths
26, 26' lowest section
28, 28', 28" highest section
30 longitudinal axis suction-side depression
32 imaginary circumferential line, leading edges
34 longitudinal axis pressure-side elevation
36 connecting section
38 (rear) suction-side elevation
40 imaginary circumferential line, trailing edges
42 longitudinal axis (rear) suction-side elevation
100 continuous flow machine
114 outer delimiting wall
z radial direction
u circumferential direction
x flow direction/axial direction

What is claimed is:

1. A blade cascade for a continuous-flow machine, comprising:
    at least one blade channel delimited in a circumferential direction by a pressure-side wall of a blade and by an opposite suction-side wall of an adjacent blade, and delimited in the radial direction by two opposite delimiting walls, and delimited in the direction of a main flow by leading edges and by trailing edges of the blades,
    at least one of the delimiting walls being provided with at least one suction-side depression, at least one pressure-side elevation and a pressure-side depression,
    the at least one suction-side depression being at a distance from the suction-side wall in the circumferential direction, a section of the at least one suction-side depression being arranged upstream from the leading edges and an other section of the at least one suction-side depression being arranged downstream from the leading edges,
    the at least one pressure-side elevation transitioning into the pressure-side wall and being located in a front blade area, and
    the pressure-side depression being located upstream from the at least one pressure-side elevation.

2. The blade cascade as recited in claim 1 wherein the at least one suction-side depression, the at least one pressure-side elevation and the pressure-side depression are at a distance from each other, separated by non-contoured delimiting wall sections.

3. The blade cascade as recited in claim 1 wherein the at least one suction-side depression extends all the way to a largest curvature of the suction-side wall.

4. The blade cascade as recited in claim 1 wherein the at least one suction-side depression has a lowest section extending upstream and downstream from the leading edges.

5. The blade cascade as recited in claim 4 wherein a highest section of the at least one pressure-side elevation and the lowest section of the at least one suction-side depression are configured as plateaus, the highest section having a larger plateau surface than the lowest section.

6. The blade cascade as recited in claim 4 wherein the lowest section and a highest section of the at least one pressure-side elevation are each located at a radial position whose values are the same.

7. The blade cascade as recited in claim 1 wherein the at least one pressure-side elevation runs downstream along the pressure-side wall beyond the at least one suction-side depression, and a highest section of the at least one pressure-side elevation runs upstream all the way to the leading edge.

8. The blade cascade as recited in claim 7 wherein the highest section of the at least one pressure-side elevation and a lowest section of the at least one suction-side depression are configured as plateaus, the highest section having a larger plateau surface than the lowest section.

9. The blade cascade as recited in claim 7 wherein a lowest section of the at least one suction-side depression and the highest section are each located at a radial position whose values are the same.

10. The blade cascade as recited in claim 1 wherein the pressure-side and the at least one suction-side depressions start at a similar axial position in the flow direction.

11. The blade cascade as recited in claim 1 wherein the pressure-side depression is funnel-shaped and a lowest section is located radially outwards with respect to a lowest section of the at least one suction-side depression.

12. The blade cascade as recited in claim 1 wherein a suction-side elevation is provided on the suction-side wall downstream from the at least one suction-side depression.

13. The blade cascade as recited in claim 12 wherein, as seen in the circumferential direction, the at least one pressure-side elevation and suction side elevation transition into each other and end downstream at similar positions.

14. The blade cascade as recited in claim 12 wherein a highest section of the at least one pressure-side elevation is located radially outwards with respect to a highest section of the suction-side elevation, and has a larger surface area than the highest section of the suction-side elevation.

15. The blade cascade as recited in claim 1 wherein the inner delimiting wall has the at least one suction-side depression, pressure-side depression and the at least one pressure-side elevation and is configured to be non-contoured upstream from the at least one suction-side depression and pressure depression, and downstream from the trailing edges.

16. A continuous-flow machine comprising at least one blade cascade as recited in claim 1.

* * * * *